US010623297B2

(12) United States Patent
Regev (10) Patent No.: US 10,623,297 B2
(45) Date of Patent: Apr. 14, 2020

(54) METHODS, SYSTEMS, AND COMPUTER READABLE MEDIA FOR TESTING SCHEDULING FIDELITY IN A TIME SENSITIVE NETWORK

(71) Applicant: Keysight Technologies Singapore (Sales) Pte. Ltd., Singapore (SG)

(72) Inventor: Alon Regev, Woodland Hills, CA (US)

(73) Assignee: Keysight Technologies Singapore (Sales) Pte. Ltd., Singapore (SG)

(*) Notice: Subject to any disclaimer, the term of this patent is extended or adjusted under 35 U.S.C. 154(b) by 210 days.

(21) Appl. No.: 15/647,207

(22) Filed: Jul. 11, 2017

(65) Prior Publication Data

US 2018/0309656 A1    Oct. 25, 2018

Related U.S. Application Data

(63) Continuation-in-part of application No. 15/498,452, filed on Apr. 26, 2017, now Pat. No. 10,425,321.

(51) Int. Cl.
*H04L 12/26*    (2006.01)
*G06F 11/273*    (2006.01)
(Continued)

(52) U.S. Cl.
CPC .......... *H04L 43/50* (2013.01); *G06F 11/2294* (2013.01); *G06F 11/273* (2013.01); *H04J 3/0667* (2013.01); *H04L 43/045* (2013.01); *H04L 43/106* (2013.01); *H04L 43/0852* (2013.01); *H04L 43/16* (2013.01)

(58) Field of Classification Search
CPC .............. G06F 11/273; G06F 11/2733; G06F 11/2294; H04L 43/50; H04L 43/106; H04L 43/0864; H04L 43/10
See application file for complete search history.

(56) References Cited

U.S. PATENT DOCUMENTS 6,868,069 B2    3/2005    Knobbe et al.
7,092,586 B2    8/2006    Vokey et al.
(Continued)

FOREIGN PATENT DOCUMENTS

CN    101447861 B    10/2011
CN    108737003 A    11/2018
(Continued)

OTHER PUBLICATIONS

Final Office Action for U.S. Appl. No. 15/482,672 (dated Apr. 2, 2019).
(Continued)

*Primary Examiner* — Jigar P Patel (57) ABSTRACT

Methods, systems, and computer readable media for testing and/or determining scheduling fidelity in a time sensitive network (TSN) are disclosed. According to one method for determining scheduling fidelity in a TSN, the method occurs in a test system. The method includes receiving, via a system under test (SUT), at least one expected receive time indicating when a test packet is expected to be received by at least one destination. The method further includes computing, using the at least one expected receive time and at least one actual receive time, a time variation metric associated with the test packet.

14 Claims, 4 Drawing Sheets

(51) Int. Cl.
*G06F 11/22* (2006.01)
*H04J 3/06* (2006.01)

(56) References Cited

U.S. PATENT DOCUMENTS

| | | | |
|---|---|---|---|
| 7,272,750 B2* | 9/2007 | Sirbu | G06F 11/2257 709/224 |
| 7,649,912 B2 | 1/2010 | Balasubramanian et al. | |
| 7,881,209 B2 | 2/2011 | Beliles, Jr. et al. | |
| 8,718,482 B1 | 5/2014 | Roberts | |
| 8,767,565 B2 | 7/2014 | Dalmau et al. | |
| 9,106,353 B2 | 8/2015 | Hsueh et al. | |
| 9,130,945 B2 | 9/2015 | Smith et al. | |
| 9,288,777 B2 | 3/2016 | Hollabaugh et al. | |
| 9,380,070 B1 | 6/2016 | Cain et al. | |
| 9,686,169 B2 | 6/2017 | Formby et al. | |
| 9,699,051 B2 | 7/2017 | Rata et al. | |
| 9,736,804 B2 | 8/2017 | Regev | |
| 9,800,595 B2 | 10/2017 | Jackson | |
| 9,813,226 B2 | 11/2017 | Bergeron | |
| 9,923,656 B2 | 3/2018 | Tenea et al. | |
| 10,014,937 B1 | 7/2018 | Di Mola et al. | |
| 10,019,333 B2 | 7/2018 | Regev | |
| 10,158,441 B1 | 12/2018 | Butterworth et al. | |
| 10,425,321 B2 | 9/2019 | Joseph et al. | |
| 2002/0065929 A1* | 5/2002 | Kamentsky | H04L 29/06 709/231 |
| 2002/0093917 A1 | 7/2002 | Knobbe et al. | |
| 2003/0105976 A1 | 6/2003 | Copeland, III | |
| 2003/0200483 A1 | 10/2003 | Sutton | |
| 2004/0190547 A1 | 9/2004 | Gordy et al. | |
| 2007/0268938 A1 | 11/2007 | Dowd | |
| 2009/0217075 A1 | 8/2009 | Adar et al. | |
| 2009/0231191 A1 | 9/2009 | Wu et al. | |
| 2009/0257354 A1 | 10/2009 | Hannel et al. | |
| 2010/0039157 A1 | 2/2010 | Kaeriyama et al. | |
| 2010/0098111 A1 | 4/2010 | Sun et al. | |
| 2011/0170534 A1 | 7/2011 | York | |
| 2011/0199133 A1 | 8/2011 | Yamada | |
| 2011/0211473 A1 | 9/2011 | Matityahu et al. | |
| 2011/0268097 A1 | 11/2011 | Agrawala et al. | |
| 2012/0166327 A1 | 6/2012 | Amicangioli | |
| 2012/0275317 A1 | 11/2012 | Geva | |
| 2013/0080817 A1 | 3/2013 | Mihelic | |
| 2013/0086250 A1 | 4/2013 | Eskicioglu et al. | |
| 2013/0094515 A1 | 4/2013 | Gura et al. | |
| 2013/0170507 A1 | 7/2013 | Hsueh et al. | |
| 2013/0173778 A1 | 7/2013 | Hsy et al. | |
| 2013/0212439 A1 | 8/2013 | Stevens et al. | |
| 2013/0259049 A1 | 10/2013 | Mizrahi | |
| 2013/0265886 A1 | 10/2013 | Leong et al. | |
| 2013/0278312 A1 | 10/2013 | Getzin et al. | |
| 2013/0329595 A1 | 12/2013 | Scholz | |
| 2013/0343207 A1 | 12/2013 | Cook et al. | |
| 2013/0347103 A1 | 12/2013 | Veteikis et al. | |
| 2014/0006610 A1 | 1/2014 | Formby et al. | |
| 2014/0164860 A1 | 6/2014 | Kim | |
| 2014/0185632 A1 | 7/2014 | Steiner et al. | |
| 2014/0247839 A1 | 9/2014 | Kingsley | |
| 2014/0269337 A1* | 9/2014 | Gintis | H04L 43/50 370/241 |
| 2014/0297852 A1 | 10/2014 | Shimizu et al. | |
| 2014/0304505 A1 | 10/2014 | Dawson | |
| 2014/0317288 A1 | 10/2014 | Krueger et al. | |
| 2014/0321285 A1 | 10/2014 | Chew et al. | |
| 2014/0344930 A1 | 11/2014 | Foley | |
| 2015/0016274 A1 | 1/2015 | Holland | |
| 2015/0023168 A1 | 1/2015 | Kotecha et al. | |
| 2015/0023170 A1 | 1/2015 | Kakadia et al. | |
| 2015/0103828 A1 | 4/2015 | Chandhoke et al. | |
| 2015/0103832 A1 | 4/2015 | Chandhoke et al. | |
| 2015/0103836 A1 | 4/2015 | Chandhoke et al. | |
| 2015/0103848 A1 | 4/2015 | Chandhoke et al. | |
| 2015/0245306 A1 | 8/2015 | Boehlke | |
| 2015/0281025 A1 | 10/2015 | Wallbaum et al. | |
| 2016/0065434 A1 | 3/2016 | Janakiraman | |
| 2016/0110211 A1 | 4/2016 | Karnes | |
| 2016/0110212 A1 | 4/2016 | Karnes | |
| 2016/0285575 A1 | 9/2016 | Holmeide | |
| 2016/0301589 A1 | 10/2016 | Rata et al. | |
| 2016/0301599 A1 | 10/2016 | Porfiri et al. | |
| 2016/0306726 A1 | 10/2016 | Regev | |
| 2016/0309434 A1 | 10/2016 | Regev | |
| 2016/0315756 A1 | 10/2016 | Tenea et al. | |
| 2017/0041126 A1 | 2/2017 | Bergeron | |
| 2017/0085581 A1 | 3/2017 | Jackson | |
| 2017/0331748 A1 | 11/2017 | Mangin | |
| 2018/0070373 A1 | 3/2018 | Muench | |
| 2018/0160424 A1 | 6/2018 | Cavalcanti et al. | |
| 2018/0184438 A1 | 6/2018 | Cavalcanti et al. | |
| 2018/0191642 A1 | 7/2018 | Biederman et al. | |
| 2018/0227067 A1 | 8/2018 | Hu et al. | |
| 2018/0237039 A1 | 8/2018 | Mong et al. | |
| 2018/0295144 A1 | 10/2018 | Jackson | |
| 2018/0302330 A1 | 10/2018 | Bush | |
| 2018/0302331 A1* | 10/2018 | Bush | H04L 47/28 |
| 2018/0309655 A1 | 10/2018 | Joseph et al. | |
| 2018/0316592 A1 | 11/2018 | Ellegaard | |

FOREIGN PATENT DOCUMENTS

| | | |
|---|---|---|
| DE | 10 2018 109 689 A1 | 10/2018 |
| EP | 3 284 244 B1 | 12/2019 |
| WO | WO 2011/144263 A1 | 11/2011 |
| WO | WO 2016/168063 A1 | 10/2016 |
| WO | WO 2016/168064 A1 | 10/2016 |
| WO | WO 2017/052714 A1 | 3/2017 |

OTHER PUBLICATIONS

Communication of the extended European search report for European Patent Application Serial No. 16849136.3 (dated Feb. 20, 2019).

Bhunia et al., "Hardware Trojan Attacks: Threat Analysis and Countermeasures," Proceedings of the IEEE, vol. 102, No. 8, pp. 1-20 (Aug. 2014).

"Time-Sensitive Networking Task," Wikipedia, the free encyclopedia, https://en.wikipedia.org/wiki/Time-Sensitive_Networking, pp. 1-7 (Aug. 29, 2017).

Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).

"IEEE Standard for Local and metropolitan area networks—Bridges and Bridged Networks—Amendement 29: Cyclic Queuing and Forwarding," IEEE Computer Society, IEEE Std 802.1Qch™—2017, pp. 1-28 (May 18, 2017).

Commonly-assigned, co-pending U.S. Appl. No. 15/498,452 for "Methods, Systems and Computer Readable Media for Testing Time Sensitive Network (TSN) Elements,"(Unpublished, filed Apr. 26, 2017).

"IEEE Standard for Local and metropolitan area networks—Bridges and Bridged Networks—Amendment 26: Frame Preemption," IEEE Computer Society, IEEE Std 802.1Qbu™—2016, pp. 1-51 (Jun. 30, 2016).

"IEEE Standard for Local and metropolitan area networks—Bridges and Bridged Networks—Amendment 25: Enhancements for Scheduled Traffic," IEEE Computer Society, IEEE Std 802.1Qbv™—2015, pp. 1-55 (Dec. 5, 2015).

"IEEE Standard for Local and metropolitan area networks—Bridges and Bridged Networks—Amendment 24: Path Control and Reservation," IEEE Computer Society, IEEE Std 802.1Qca™—2015, pp. 1-105 (Sep. 3, 2015).

Finn, "802.1Qav + P802.1Qbv Time-gated Shapers," Cisco System, IEEE 802 Pleanry, pp. 1-12 (Nov. 5, 2014).

Boiger, "Deterministic Ethernet—IEEE 802.1 standard for real-time process control, industrial automation, and vehicular networks," IEEE 802 Tutoria, pp. 1-72 (Nov. 12, 2012).

(56) References Cited

OTHER PUBLICATIONS

Boiger, "Time Aware Shaper," Deggendorf University of Applied Sciences, IEEE 802.1 Pleanry, pp. 1-12 (Sep. 2012).
"IEEE Standard for Local and metropolitan area networks—Timing and Synchronization for Time-Sensitive Applications in Bridged Local Area Networks," IEEE Computer Society, IEEE Std 802.1AS™—2011, pp. 1-274 (Mar. 30, 2011).
Commonly-assigned, co-pending U.S. Appl. No. 16/264,127 for "Methods, Systems, and Computer Readable Media for Detecting and Mitigating Effects of Timing Attacks in Time Sensitive Networks (TSNs)." (Unpublished, filed Jan. 31, 2019).
Commonly-assigned, co-pending U.S. Appl. No. 16/258,485 for "Active Network Tap Supporting Time Sensitive Network (TSN) Standards," (Unpublished, filed Jan. 25, 2019).
"1588v2 Sync and Delay_Req Messages Format," http://support.huawei.com/headex/pages/EDOC1000105968300081 25/05/EDOC100010596830008125/05/resources/message/cd feature 1588v2 format-sync.html, pp. 1-2 (Downloaded Jan. 9, 2019).
Non-Final Office Action for U.S. Appl. No. 15/482,672 (dated Nov. 16, 2018).
Moussa et al., "A Detection and Mitigation Model for PTP Delay Attack in an IEC 61850 Substation", IEEE Transactions on Smart Grid, vol. 9, No. 5, pp. 3954-3965 (Sep. 2018).
Communication of the Extended European Search Report for European Patent Application Serial No. 16780481.4 (dated Sep. 6, 2018).
Communication of the Extended European Search Report for European Patent Application Serial No. 16780482.2 (dated Aug. 9, 2018).
Communication of European publication number and information on the application of Article 67(3) EPC for European Patent Application Serial No. 16849136.3 (dated Jul. 4, 2018).
Notice of Allowance and Fee(s) Due for U.S. Appl. No. 14/688,644 (dated Feb. 28, 2018).
Notice of Allowance and Fee(s) Due for U.S. Appl. No. 14/809,513 (dated Nov. 7, 2017).
Non-Final Office Action for U.S. Appl. No. 14/688,644 (dated Jul. 26, 2017).
Notice of Allowance and Fee(s) Due for U.S. Appl. No. 14/819,337 (dated Jun. 21, 2017).
Notice of Allowance and Fee(s) Due and Examiner Initiated Interview Summary for U.S. Appl. No. 14/860,630 (dated Jun. 13, 2017).
Non-Final Office Action for U.S. Appl. No. 14/809,513 (dated May 30, 2017).
Notice of Allowance and Fee(s) Due for U.S. Appl. No. 14/688,630 (dated Apr. 12, 2017).
Non-Final Office Action for U.S. Appl. No. 14/819,337 (dated Mar. 2, 2017).
Notice of Allowance and Fee(s) Due for U.S. Appl. No. 14/685,552 (dated Mar. 1, 2017).
Notice of Allowance and Fee(s) Due for U.S. Appl. No. 13/933,661 (dated Feb. 17, 2017).
Non-Final Office Action for U.S. Appl. No. 14/860,630 (dated Dec. 19, 2016).
Non-Final Office Action for U.S. Appl. No. 14/685,552 (dated Oct. 20, 2016).
Non-Final Office Action for U.S. Appl. No. 14/688,630 (dated Oct. 17, 2016).
Non-Final Office Action for U.S. Appl. No. 13/933,661 (dated Sep. 27, 2016).
Notification of Transmittal of the International Search Report and the Written Opinion of the International Searching Authority, or the Declaration for International Application No. PCT/US2016/040532 (dated Sep. 12, 2016).
Notification of Transmittal of the International Search Report and the Written Opinion of the International Searching Authority, or the Declaration for International Application No. PCT/US2016/026534 (dated Jul. 8, 2016).

Notification of Transmittal of the International Searh report and the Written Opinion of the International Searching Authority, or the Declaration for International Application No. PCT/US2016/026533 (dated Jul. 8, 2016).
Final Office Action for U.S. Appl. No. 13/933,661 (dated Apr. 12, 2016).
Non-Final Office Action for U.S. Appl. No. 13/933,661 (dated Dec. 14, 2015).
"External Bypass Switches," Ixia, White Paper, 915-6688-01 Rev. B, pp. 1-5 (Dec. 2015).
"Network Time Protocol," Wikipedia, https://en.wikipedia.org/wiki/Network_Time_ Protocol, pp. 1-7 (Jul. 3, 2015).
"High Density Modular Fiber Tap," Ixia, http://www.ixiacom.com/products/net-optics-flex-tap, pp. 1-4 (Jul. 2014).
Watt et al., "Understanding and Applying Precision Time Protocol," Power and Energy Automation Conference, pp. 1-7 (Mar. 2014).
"Ixia Anue 3500—Mobile Backhaul Testing Solution," Ixia Data Sheet, pp. 1-5 (Dec. 2013).
Arnold, "What are all of These IEEE 1588 Clock Types," http://blog.meinbergglobal.com/2013/10/21/ieee1588clocktypes/, News and Tutorials from Meinberg, pp. 1-6 (Oct. 21, 2013).
"AN-1838 IEEE 1588 Boundary Clock and Transparent Clock Implementation Using the DP83640," Application Report, Texas Instruments, pp. 1-9 (Apr. 2013).
"AN-1728 IEEE 1588 Precision Time Protocol Time Synchronization Performance," Application Report, SNLA098A, Texas Instruments, pp. 1-10 (Apr. 2013).
Spirent, "Precision Time Protocol (PTP) IEEE 1588," YouTube "alantalkstech", https://www.youtube.com/watch?v=yw-gd01aOYg, pp. 1-11 (Dec. 7, 2011).
"IEEE Standard for Local and metropolitan area networks—Timing and Synchronization for Time-Sensitive Applications in Bridged Local Area Networks," IEEE Computer Society, IEEE Std 802.1ASTM—2011, pp. 1-274 (Mar. 30, 2011).
Ullmann et al., "Delay Attacks—Implication on NTP and PTP Time Synchronization", ISPCS 2009 International IEEE Symposium on Precision Clock Synchronization for Measurement, Control, and Communication, pp. 1-6 (Oct. 12-16, 2009).
"Precision Clock Synchronization the Standard IEEE 1588", Hirschmann, White Paper, pp. 1-20. (Feb. 2009).
Eidson, "IEEE-1588 Standard for a Precision Clock Synchronization Protocol for Networked Measurement and Control Systems—A Tutorial," Agilent Technologies, pp. 1-94 (Oct. 2005).
"IEEE 1588 Precise Time Protocol: The New Standard in Time Synchronization" Microsemi Power Matters, White Paper, pp. 1-10 (Copyright 2005-2017).
Non-Final Office Action for U.S. Appl. No. 15/498,452 (dated Nov. 5, 2018).
Non-Final Office Action for U.S. Appl. No. 15/482,672 (dated Jun. 14, 2016).
Communication under Rule 71(3) EPC for European Patent Application Serial No. 16 780 481.4 (dated May 7, 2019).
Notice of Allowance and Fee(s) Due for U.S. Appl. No. 15/498,452 (dated May 10, 2019).
Decision to grant a European patent pursuant to Article 97(1) EPC for European Patent Application Serial No. 16780482.2 (dated Nov. 21, 2019).
Decision to grant a European patent pursuant to Article 97(1) EPC for European Patent Application Serial No. 16780481.4 (dated Sep. 12, 2019).
Communication under Rule 71(3) EPC Intention to Grant for European Patent Application Serial No. 16 780 482.2 (dated Jul. 9, 2019).
Alhady et al., "Time-aware Traffic Shaper using Time-based Packet Scheduling in Intel I210," International Journal of Research and Engineering, vol. 5, No. 9, pp. 494-499 (Sep.-Oct. 2018).
Communication of European publication number and information on the application of Article 67(3) EPC for European Patent Application Serial No. 16780482.2 (dated Jan. 24, 2018).
Communication of European publication number and information on the application of Article 67(3) EPC for European Patent Application Serial No. 16780481.4 (dated Jan. 24, 2018).

(56) References Cited

OTHER PUBLICATIONS

"Time-Sensitive Networking," Wikipedia, the free encyclopedia, https://en.wikipedia.org/wiki/Time-Sensitive_Networking, pp. 1-7 (Aug. 29, 2017).

Wisniewski et al., "Seamless Schedule Switching in Time Triggered Ethernet based Communication Systems," ResearchGate, pp. 1-11 (Nov. 2015).

Thangamuthu et al., "Analysis of Ethernet-Switch Traffic Shapers for In-Vehicle Networking Applications," Design, Automation & Test in Europe Conference & Exhibition, pp. 1-6 (2015).

Thangamuthu, S., Analysis of Automotive Traffic Shapers in Ethernet In-Vehicular Networks, Eindhoven University of Technology, Master's Thesis pp. 1-89 (Aug. 2014).

Boiger, Christain, "Time Aware Shaper," IEEE 802 Plenary, Deggendorf University of Applied Sciences, pp. 1-9 (May 2012).

Notice of Allowance and Fee(s) Due and Examiner-Initiated Interview Summary for U.S. Appl. No. 15/482,672 (dated Dec. 18, 2019).

Communication under Rule 71(3) EPC Intention to Grant for European Patent Application Serial No. 16 849 136.3 (dated Dec. 12, 2019).

\* cited by examiner

METHODS, SYSTEMS, AND COMPUTER READABLE MEDIA FOR TESTING SCHEDULING FIDELITY IN A TIME SENSITIVE NETWORK

PRIORITY CLAIM

This application is a continuation-in-part of U.S. patent application Ser. No. 15/498,452, filed Apr. 26, 2017, which claims the benefit of Romanian Patent Application No. a 00246 2017, filed Apr. 25, 2017; the disclosure of each of which is incorporated herein by reference in its entirety.

TECHNICAL FIELD

The subject matter described herein relates to testing network elements. More specifically, the subject matter relates to methods, systems, and computer readable media for testing and/or determining scheduling fidelity in a time sensitive network (TSN).

BACKGROUND

Time sensitive networks can be generally defined as networks that may communicate at least some time sensitive data. As such, time sensitive networks need to be capable of communicating time sensitive data within an acceptable amount of time. While many of today's communications networks follow a best-effort approach (e.g., various Ethernet and Internet protocol (IP) based networks), a best-effort approach is generally not suitable for time sensitive applications because even minor delays in the transmission and/or delivery of time sensitive content (e.g., data between components in a vehicle control network) is unacceptable for such applications.

To overcome the drawbacks of communications networks that use a best-effort approach, various TSN related technologies and standards have emerged. For example, the IEEE 802.1 Time-Sensitive Networking Task Group is currently in the process of specifying a set of protocols for TSNs. These protocols may provide, require, or promote behaviors for limiting and/or controlling communication related latency in TSNs. Example behaviors for TSNs may include precise synchronization between all TSN elements (e.g., devices), traffic shaping or scheduling for time sensitive streams, reservation or "admission control" for reserving or pre-allocating bandwidth and frequency for transmitting or receiving time sensitive streams, and/or identification of non-participating (e.g., "non-TSN") elements within a TSN.

Issues arise when attempting to test resources within a TSN. For example, challenges exist in testing whether a TSN element and/or related components are implementing appropriate functionality and/or are implementing standards and/or protocols accurately.

SUMMARY

Methods, systems, and computer readable media for testing and/or determining scheduling fidelity in a time sensitive network (TSN) are disclosed. According to one method for determining scheduling fidelity in a TSN, the method occurs in a test system. The method includes receiving, via a system under test (SUT), at least one expected receive time indicating when a test packet is expected to be received by at least one destination. The method further includes computing, using the at least one expected receive time and at least one actual receive time, a time variation metric associated with the test packet.

According to one system for determining scheduling fidelity in a TSN, the test system comprises at least one processor and a test controller module implemented using the at least one processor. The test controller module is configured for: receiving, via a system under test (SUT), at least one expected receive time indicating when a test packet is expected to be received by at least one destination; and computing, using the at least one expected receive time and at least one actual receive time, a time variation metric associated with the test packet.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the terms "packet" or "message" refers to one or more data units for storing and/or communicating data, such as an Internet protocol (IP) packet, an Ethernet frame, an Ethernet packet, a datagram, and/or other data units.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for testing and/or determining scheduling fidelity in a time sensitive network (TSN). A TSN may involve various TSN nodes or elements (e.g., relays and end stations) that have clocks with synchronized time. For example, a TSN and/or nodes therein may use various time synchronization mechanisms, e.g., a time synchronization protocol, such as an IEEE gPTP or IEEE PTP based protocol. Transmitting TSN elements (e.g., relays and talkers) may be aware of when they are scheduled to transmit. For example, each transmitting TSN element may utilize a time aware shaper (TAS) and/or one or more TSN schedules (e.g., gate access lists and/or stream transmit schedules) for one or more TSN streams. In this example, a gate access list may indicate when a gate or transmission window (e.g., one or more switch ports) is opened or closed for particular traffic (e.g., one or more streams) to be transmitted and a stream transmit schedule may indicate when specific stream messages or packets are to be transmitted or received. During a transmission window for scheduled messages, other message queues or streams may be blocked such that the scheduled messages can be sent without delays caused by interfering traffic.

Schedule rules and/or a related schedule may be used for minimizing latency in a TSN by providing transmission windows for TSN elements (e.g., talkers and/or relays) to send and/or receive messages. For example, schedule rules and/or a related schedule may result in non-scheduled traffic being blocked such that a port or related transmission medium is idle when scheduled traffic is to be transmitted. It will be appreciated that schedule rules and/or a TSN schedule are more effective when TSN elements or their related clocks are synchronized so as to minimize the effects of interfering traffic. However, issues can arise if schedule rules are not followed correctly or uniformly among the various TSN elements because interfering traffic may occur.

In accordance with some aspects of the subject matter described herein, techniques, methods, equipment, systems, and/or mechanisms are disclosed for testing and/or determining scheduling fidelity in a TSN or a TSN element. For example, a test system may be configured for testing or determining scheduling fidelity in a TSN or TSN element therein. In this example, to test the TSN or a TSN element therein, the test system may receive, via a system under test (SUT), at least one expected receive time indicating when a test packet is expected to be received by at least one destination (e.g., the least one expected receive time may be determined using scheduling information associated with a TSN schedule). The method further includes computing, using the at least one expected receive time and at least one actual receive time, a time variation metric associated with the test packet.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
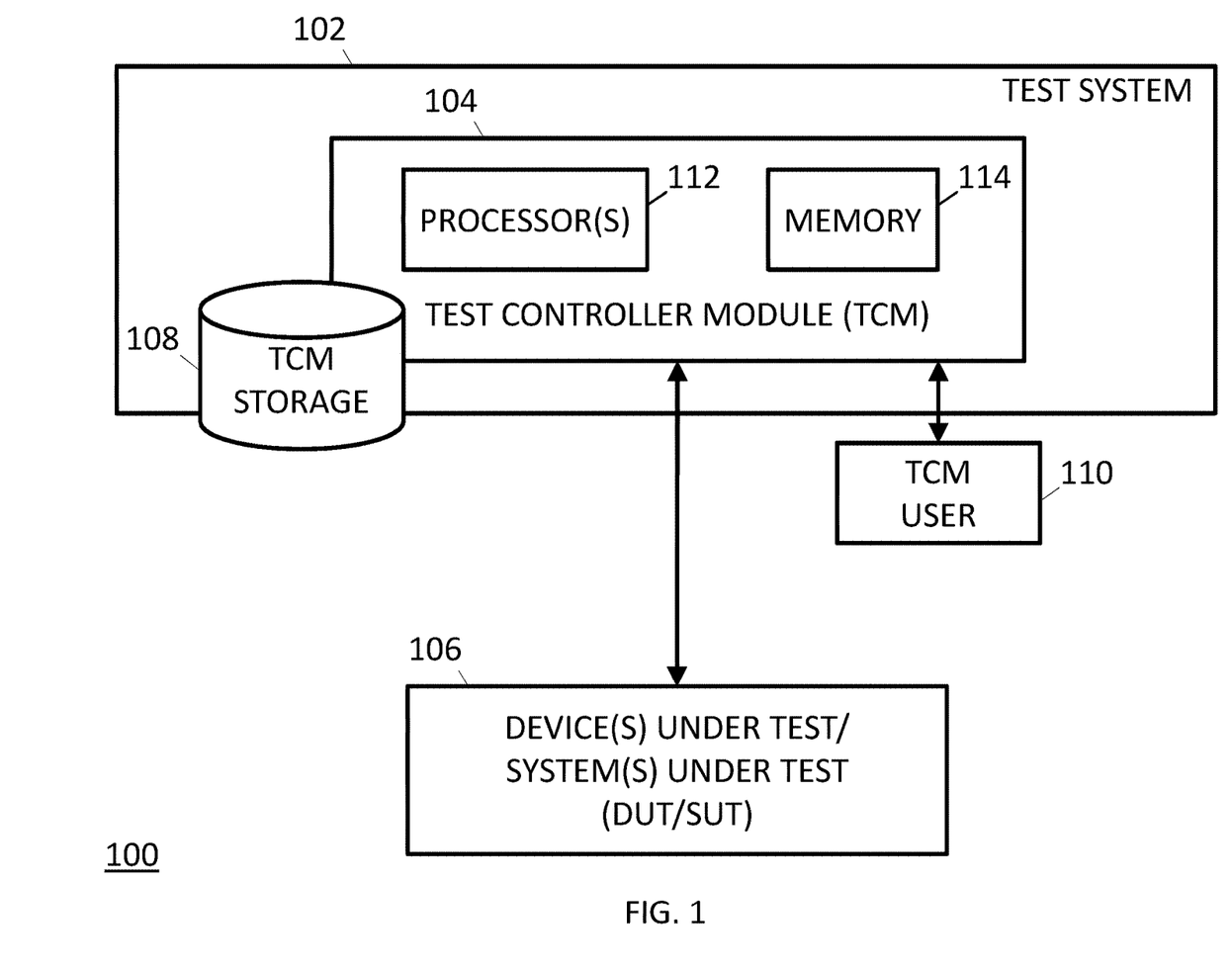
FIG. 1 is a diagram illustrating an example test environment for testing scheduling fidelity in a time sensitive network (TSN)

FIG. 1 is a diagram illustrating an example test environment 100 for testing scheduling fidelity in a time sensitive network (TSN). Referring to FIG. 1, test environment 100 may include test system 102 and one or more device(s) and/or system(s) under test (SUT) 106. Test system 102 may represent any suitable entity or entities (e.g., one or more computing platforms, nodes, or devices) associated with testing SUT 106 (e.g., one or more TSN elements). For example, test system 102 may generate and send traffic to SUT 106 and/or receive traffic from SUT 106 and may analyze one or more aspects associated with SUT 106.

In some embodiments, test system 102 may be a standalone tool, a testing device, or software executing on one or more processor(s) 112. In some embodiments, test system 102 may be a single device or node or may be distributed across multiple devices or nodes. In some embodiments, test system 102 may include one or more modules for performing various test related functions. For example, test system 102 may include a TSN element emulation module for emulating one or more TSN nodes or devices that communicates with SUT 106.

Test system 102 may include processor(s) 112, a memory 114, and a test controller module (TCM) 104. Processor(s) 112 may represent or include a physical processor, a general purpose microprocessor, a single-core processor, a multi-core processor, a field-programmable gateway array (FPGA), and/or an application-specific integrated circuit (ASIC) for executing software and/or logic stored in memory 114. Memory 114 may represent one or more computer readable media for storing data, logic, or other information.

TCM 104 may be any suitable entity or entities (e.g., software executing on a processor, an ASIC, an FPGA, or a combination of software, an ASIC, and/or an FPGA) for performing one or more aspects associated with testing SUT 106 and/or various aspects thereof. In some embodiments, TCM 104 may be implemented using processor(s) 112 and/or memory 114. For example, TCM 104 may utilize processor(s) 112 (e.g., using software stored in memory 114) to generate test packets for a number of message streams (e.g., flows or sessions). In this example, TCM 104 may also utilize processor(s) 112 to perform various tests and/or analyses involving test packets and/or related responses from SUT 106.

In some embodiments, TCM 104 may include one or more communications interfaces (e.g., one or more receive port modules and one or more transmit port modules) for interacting with users, modules, and/or nodes. For example, port modules may include network interface cards (NICs) or other suitable hardware, firmware, and/or software for receiving or transmitting data via ports (e.g., physical or logical communication end points).

In some embodiments, TCM 104 may use one or more communications interfaces for receiving various messages and one or more communications interfaces sending various messages. Example messages include IP messages, Ethernet frames, Ethernet messages, PDUs, datagrams, UDP messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other TSN related messages.

In some embodiments, TCM 104 may include or provide a communications interface for communicating with TCM user 110. TCM user 110 may be any entity (e.g., an automated system or a device or system controlled or controllable by a human user) for selecting and/or configuring various aspects associated with testing and/or generating testing related metrics. For example, various user interfaces (e.g., an application user interface (API) and a graphical user interface (GUI)) may be provided for providing configuration information, such as tests to be performed, issues to be analyzed, impairments to be generated, types of metrics or statistics to be generated, a number of test packets per port or stream to be generated, and/or other settings.

In some embodiments, TCM 104 may include one or more communications interfaces for interacting with SUT 106. For example, TCM 104 or another entity may be configured to send or receive test packets to or from one or more ports (e.g., ports 1, 2, and/or 3) associated with SUT 106. SUT 106 may be any suitable entity or entities (e.g., devices, systems, or platforms) for communicating with test system 102 and/or receiving, processing, forwarding and/or sending one or more messages. For example, SUT 106 may include at least one TSN element that can communicate time sensitive data or related messages. In another example, SUT 106 may include one or more systems and/or computing platforms, e.g., a group of servers and/or routers. In yet another example, SUT 106 may include one or more networks or related components, e.g., a TSN or portion thereof.

In some embodiments, TSN elements that may be tested by test system 102 or TCM 104 may include a network relay, a time synchronization protocol relay, a network router, a network switch, a network device, a server, or a network controller.

In some embodiments, one or more user interfaces for testing SUT 106 and/or for providing configuration information may support automation e.g., via one or more programming languages (e.g., python, PHP, etc.), a representation state transfer (REST) API, a command line, and/or a web based GUI. For example, TCM user 110 may use a web browser to interact with a web based GUI for programming or configuring one or more aspects for testing SUT 106.

In some embodiments, TCM 104 may include functionality for accessing TCM storage 108 or memory 114. TCM storage 108 may be any suitable entity or entities (e.g., a storage device, memory 114, a non-transitory computer readable medium, or a storage system) for maintaining or storing information related to testing. For example, TCM storage 108 may store message capture related information, e.g., time delta information, timestamp related data, and/or other information. In this example, message capture related information may be usable to determine, derive, or compute one or more test related statistics, such time variation metrics for indicating scheduling fidelity.

In some embodiments, TCM storage 108 may also contain information usable for generating statistics and/or metrics associated with one or more aspects of SUT 106. For example, TCM storage 108 may contain metrics associated with one or more performance aspects of SUT 106 during one or more test scenarios. In this example, TCM storage 108 may maintain a particular set of computed metrics for a first test or message stream and may maintain another set of computed metrics for a second test or a different message stream. In some embodiments, TCM storage 108 and/or memory 114 may be located at test system 102, another node, or distributed across multiple platforms or devices.

In some embodiments, test system 102, TCM 104, or another module may be configured for testing various aspects associated with the TSN standards being proposed by the IEEE 802.1 Time-Sensitive Networking Task Group. For example, test system 102, TCM 104, or another module may be configured for testing whether SUT 106 is in compliance with or properly implements various aspects of IEEE standard 802.1Qav-2009, IEEE standard 802.1Qbv-2015, IEEE standard 802.1AS-Rev, IEEE standard 802.1Qbu-2016, IEEE standard 802.1CB, IEEE standard 802.1Qcc, IEEE standard 802.1Qca-2015, IEEE standard 802.1Qch, IEEE standard 802.1Qci-2017, IEEE standard 802.1Qcj, IEEE standard 802.1Qcp, IEEE standard 802.1Qcr, and/or IEEE standard 802.1CM. The above standards or sub-standards that are publicly available (e.g., IEEE standard 802.1Qav-2009, IEEE standard 802.1Qbv-2015, IEEE standard 802.1Qbu-2015, IEEE standard 802.1Qca-2015, and IEEE standard 802.1Qci-2017) are incorporated herein by reference in their entireties.

Some example testing performable by test system 102, TCM 104, or another module may include testing SUT 106 to determine scheduling fidelity. For example, SUT 106 may receive scheduling rules indicating when packets are to be sent or transmitted. In this example, SUT 106 may receive test packets from test system 102, TCM 104, or a related entity (e.g., a transmit port module) and may, using the scheduling rules, forward, route, or transmit the test packets back to test system 102, TCM 104, or a related entity (e.g., a receive port module). Continuing with this example, test system 102, TCM 104, or a related entity may determine scheduling fidelity at SUT 106 using the received test packets and timing information about when the test packets were received or transmitted.

In some embodiments, test system 102, TCM 104, or another module may determine scheduling fidelity by generating one or more test packets, where at least some of the test packets may contain at least one expected receive time indicating when the test packet is expected to be received by at least one destination. In this example, test system 102, TCM 104, or another module may generate the expected receive time based on TSN scheduling information and any relevant network segment delay information. Example scheduling information may include a test session start time, a test session interval value, a gate access list indicating when the test packet is to be transmitted from an originating node, or a gate access list indicating when the test packet is to be transmitted from the SUT.

In some embodiments, determining scheduling fidelity may include computing, using at least one expected receive time and at least one actual receive time, a time variation metric associated with a test packet. For example, test system 102, TCM 104, or another module (e.g., a receive port module) may receive and timestamp or otherwise identify actual receive times indicating when test packets are received. In this example, to compute a time variation metric for a particular test packet, test system 102, TCM 104, or another module may compare, analyze, or utilize an actual receive time and an expected receive time contained in the test packet to compute or generate one or more appropriate time variation metrics.

Example time variation metrics may include a latency metric, a maximum time error, a minimum time error, an average time error, or a metric indicating a total number of time errors exceeding a threshold within a time period. For example, for a packet stream (e.g., during a test session), test system 102 may identify the time difference (e.g., absolute difference or $|x-y|$) between an actual receive time and an expected receive time of each test packet. In this example, the largest time difference for a particular time period or test session may represent the maximum time error, the smallest time difference for the particular time period or test session may represent the minimum time error, and the average time difference for the particular time period or test session may represent the average time error. In another example, for a packet stream (e.g., during a test session), test system 102 may count a total number of time errors (e.g., a time error may be any event where an actual receive time and an expected receive time of a test packet is different) exceeding a threshold within a time period or a test session. In this example, the threshold may be user-configurable, e.g., a threshold may be any value more than 0 and may be based on different units of time or other units of measurements (e.g., 500 nanoseconds (ns), 2 milliseconds (ms), 10% more than an average time error value, a predetermined "allowed" time error value, etc.).

It will be appreciated that FIG. 1 is for illustrative purposes and that various nodes and/or modules, locations, and/or functionality described above in relation to FIG. 1 may be changed, altered, added, or removed.

Figure 2:
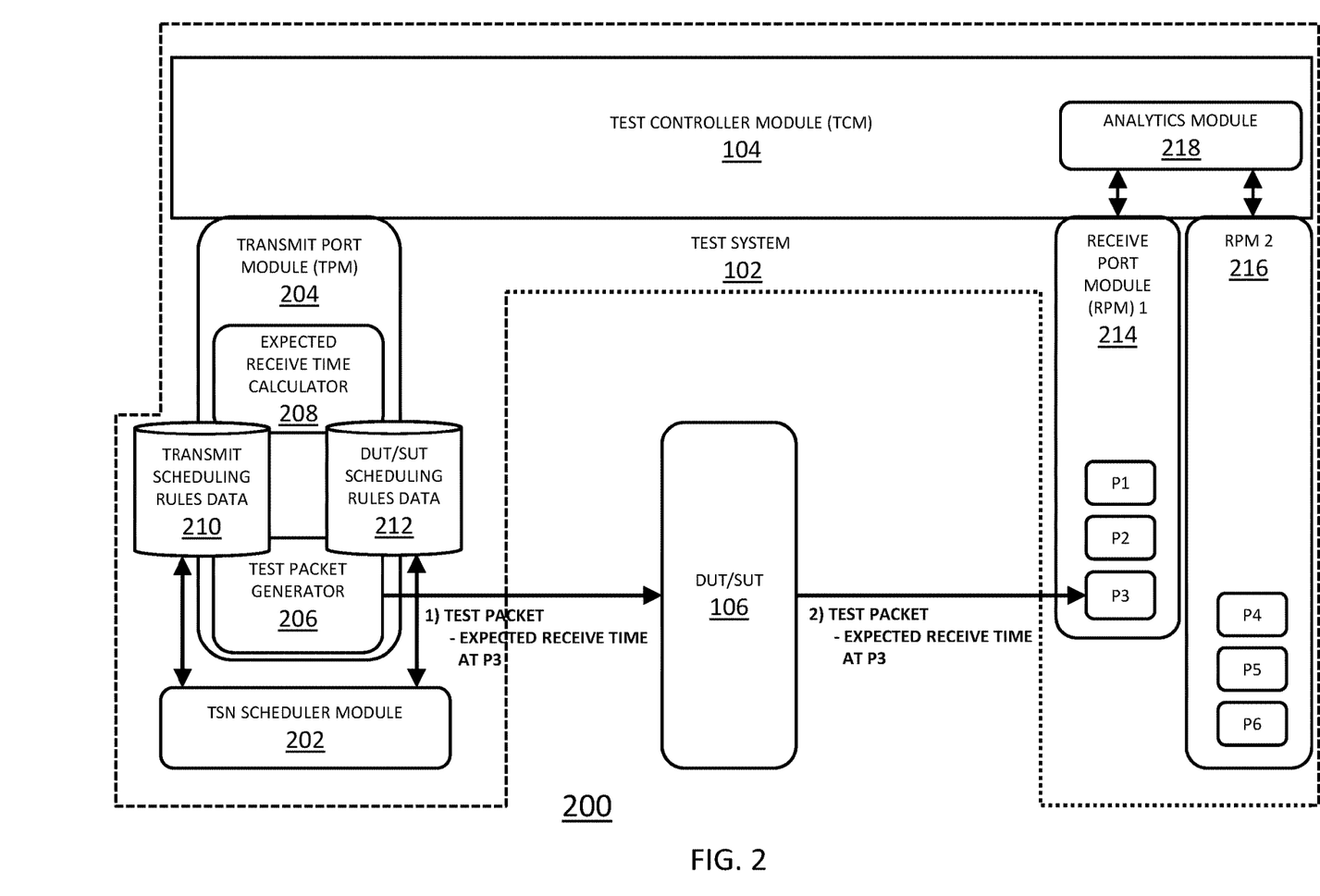
FIG. 2 is a diagram illustrating an example test environment involving sending a test packet to a destination via a system under test (SUT)

FIG. 2 is a diagram illustrating an example test environment 200 involving sending a test packet to a destination via SUT 106. In some embodiments, test system 102 and/or functionality therein may be distributed among one or more modules, devices, or computing platforms.

Referring to FIG. 2, test environment 200 may include test system 102 and SUT 106. As depicted, test system 102 may include a TCM 104, a TSN scheduler module 202, a transmit port module (TPM) 204, a receive port module (RPM) 214, an RPM 216, and an analytics module 218.

In some embodiments, test system 102 may also include or interact with a synchronization module (e.g., software executing on at least one processor) for performing various aspects associated with clock synchronization. For example, a synchronization module may implement and use a time synchronization protocol (e.g., gPTP or some other PTP profile) for managing clock synchronization for test system 102. PTP is defined in IEEE standard 1588 and gPTP is defined in IEEE standard 802.1AS; each of the references is incorporated herein by reference in its entirety.

In some embodiments, a synchronization module may include, utilize, or access a test system clock. The test system clock may be any suitable entity (e.g., a hardware-based clock or a software-based clock) for generating an indication of time and/or for maintaining time. In some embodiments, a synchronization module or a related module in test system 102 may act as a master clock (e.g., a gPTP or PTP grandmaster clock) for time synchronization purposes and SUT 106 may receive time synchronization data from test system 102, e.g., for synchronizing its own clock with the test system clock.

TSN scheduler module 202 may represent any suitable entity (e.g., software executing on at least one processor) for performing aspects associated with TAS and/or TSN message scheduling. In some embodiments, TSN scheduler module 202 and/or a related TAS may include at some functionality defined in IEEE standard 802.1Qbv-2015, the disclosure of which is herein incorporated by reference in its entirety. For example, TSN scheduler module 202 and/or a related TAS may utilize TSN nodes (e.g., switches) that are aware of the cycle time for scheduled traffic (e.g., control traffic) and may use this knowledge for blocking non-scheduled traffic during particular transmission windows, thereby ensuring that an egress port for a scheduled stream is idle when the scheduled traffic is expected.

In some embodiments, TSN scheduler module 202 may determine a TSN schedule (e.g., a message transmit schedule and/or a gate access list) across one or more test iterations.

In some embodiments, TSN scheduler module 202 may determine a TSN schedule or related rules for one or more message queues or streams. For example, each message queue or stream may be associated with a transmission gate that is either open or closed. In this example, a message (e.g., frame or packet) transmission from a message queue may only occur if the gate is open and the full message can be transmitted before the gate closes. Continuing with this example, a TSN schedule or related rules generated by TSN scheduler module 202 may include a start time (e.g., an operation base time) and a time to repeat (e.g., an operation cycle time). In some embodiments, TSN scheduler module 202 may be incorporated with test system 102 or may be distinct from test system 102 (e.g., a stand-alone computing platform).

In some embodiments, a TSN schedule or related rules may include or involve a gate access list that includes an ordered list of gate operations. For example, a gate access list may include multiple entries, where each entry may include transmission gate settings of each message queue (e.g., a gate state value) and a time to delay before executing the next list entry (e.g., a time interval value).

In some embodiments, a TSN schedule or related rules may be in compliance with or based on IEEE Standard 802.1Qbv-2015. For example, TSN scheduling rules may include a gate access list and/or other information for indicating when a gate or transmission window is open or closed.

In some embodiments (e.g., when implementing TSN scheduling rules or a related gate access list), at the start of each cycle, the first entry on the list may executed and then, after a specified time to delay, the next entry may be executed. In some embodiments, entries may be executed in this manner until the last entry is executed. Once the final entry is executed, no gate changes may be performed until the next cycle starts. An example gate access list for two queues (e.g., gates 1 and 2) is depicted in Table 1.

TABLE 1

| GATE STATE VALUE | TIME INTERVAL VALUE |
| --- | --- |
| {1, OPEN} {2, CLOSED} | 10,000 ns |
| {1, CLOSED} {2, OPEN} | 15,000 ns |
| {1, OPEN} {2, CLOSED} | 5,000 ns |

TPM 204 may represent any suitable entity (e.g., one or more network interface cards (NICs) or communications modules) for transmitting messages (e.g., frames or message sequences) to SUT 106 or other entities. In some embodiments, TPM 204 may include or represent one or more ports for sending traffic to SUT 106 and/or other entities. For example, TPM 204 may transmit test packets via one or more ports from one or more related message queues. In this example, the transmitted test packets may be sent to one or more particular ports at SUT 106.

In some embodiments, TPM 204 may include various modules for performing different aspects associated with generating and sending test packets. For example, TPM 204 may include a test packet generator 206, an expected receive time calculator 208, a transmit scheduling rules data storage 210, and a DUT/SUT scheduling rules data storage 212.

Test packet generator 206 may represent any suitable entity (e.g., a software executing on at least one processor) for generating test packets that includes estimated or expected receive times and for sending the test packets to SUT 106. For example, test packet generator 206 may access data storage for obtaining test packet data and may communicate with expected receive time calculator 208 for obtaining relevant expected receive times for test packets.

Expected receive time calculator 208 may represent any suitable entity (e.g., a software executing on at least one processor) for computing expected receive times for test packets. For example, to compute an expected receive time for a test packet, expected receive time calculator 208 may query various data structures (e.g., transmit scheduling rules data storage 210, and a DUT/SUT scheduling rules data storage 212) for obtaining scheduling information associated with the test packet. After obtaining scheduling information associated with a test packet, expected receive time calculator 208 may use scheduling information to determine when the test packet will arrive at its destination(s). For example, an expected receive time may be based on gate access lists and/or scheduling information (e.g., a test start time, the number of packets to be transmitted during the test, and the location of a particular test packet in the packets to be transmitted) for test system 102 and intermediary devices or systems (e.g., SUT 106). In this example, by knowing when a test packet is going to be transmitted from a start node and when it will be forwarded or transmitted by one or more intermediary nodes, expected receive time calculator 208 can accurately predict when a test packet will arrive at its destination(s).

In some embodiments, expected receive time calculator 208 may use scheduling information and other delay related information (e.g., network segment propagation delays) to determine when the test packet will arrive at its destination (s). In some examples, delay related information may include delays associated with an Ethernet cable, a network segment, or a connection in the TSN (e.g., test environment 100). In such examples, delays may be known (e.g., based on a mathematical formula and/or predetermined) or determinable (e.g., measured using PTP and/or gPTP functionality). Continuing with this example, an expected receive time may be based on gate access lists and/or scheduling information along with relevant network segment propagation delays for test system 102 and intermediary devices or systems (e.g., SUT 106).

In some embodiments, TSN scheduler module 202, TPM 204, expected receive time calculator 208 or other entities may include functionality for accessing transmit scheduling rules data storage 210 and/or DUT/SUT scheduling rules data storage 212. Transmit scheduling rules data storage 210 may be any suitable entity or entities (e.g., a storage device, TCM storage 108, memory 114, a non-transitory computer readable medium, or a storage system) for maintaining or storing information related to transmit scheduling rules for TPM 204 or a test session thereof. For example, data storage 210 may store one or more gate access lists indicating when TPM 204 or an entity therein can transmit test packets to SUT 106. In this example, data storage 210 may also store additional scheduling information for one or more test sessions.

DUT/SUT scheduling rules data storage 212 may be any suitable entity or entities (e.g., a storage device, TCM storage 108, memory 114, a non-transitory computer readable medium, or a storage system) for maintaining or storing information related to transmit scheduling rules for SUT 106 or a test session thereof. For example, data storage 212 may store one or more gate access lists indicating when SUT 106 or other intermediary node can transmit test packets to RPM 214 or RPM 216. In this example, data storage 212 may also store additional scheduling information for one or more test sessions.

In some embodiments, TSN scheduler module 202, TPM 204, or another module may send or share a TSN schedule or related rules with SUT 106. For example, after determining a TSN schedule or related rules but prior to testing SUT 106, TSN scheduler module 202 may trigger TPM 204 to send TSN scheduling rules to SUT 106 via one or more TPM related ports. In another example, a TSN schedule or related rules may be sent to SUT 106 using various mechanisms, e.g., via different ports (e.g., a TSN or non-TSN port), protocols (e.g., IP, HTTP, TCP, or UDP), and/or entities. In some embodiments, after receiving a TSN schedule or related rules, SUT 106 may store the TSN schedule or related rules and use it, e.g., during testing, to schedule and/or perform message transmissions.

RPMs 214 and 216 may represent any suitable entities (e.g., one or more NICs or communications modules) for receiving messages (e.g., frames or messages) from SUT 106 or other entities. In some embodiments, RPMs 214 and 216 may include or represent one or more ports for receiving traffic from SUT 106 and/or other entities. For example, RPMs 214 and 216 may receive test packets from SUT 106. In this example, RPM 214 may include a number of receive ports (e.g., ports 1-3) and RPM 216 may include a number of receive ports (e.g., ports 4-6).

In some embodiments, RPMs 214 and 216 may include functionality for identifying related test packets. For example, RPMs 214 and 216 may analyze message parameters, such as source media access control (MAC) address and a destination MAC address, for determining stream identifiers associated with received messages. In this example, the stream identifiers may be for identifying particular message streams and usable for distinguishing traffic for per stream analyses.

In some embodiments, RPMs 214 and 216 may include functionality for identifying actual receive times. For example, each of RPMs 214 and 216 may log, timestamp, or otherwise identify when a test packet is received at a receive port therein. In this example, actual receive times, the test packets, and/or other related data may be stored in a memory and/or accessible by analytics module 218 for various purposes, e.g., computing various metrics associated with testing.

Analytics module 218 may represent any suitable entity (e.g., software executing on at least one processor) for analyzing test packets, test sessions, and/or related data. In some embodiments, analytics module 218 may analyze test packets and may compute time variation metrics associated with expected receive times and actual receive times of the test packets. For example, analytics module 218 may generate or determine a time error associated with a particular test packet by calculating the absolute difference, $|x-y|$, of the test packet's expected receive time and the test packet's actual receive time. In this example, analytics module 218 may use time error to compute or determine other metrics, such as an average time error associated with a group of test packets (e.g., a test session), a maximum time error, a minimum time error, or a metric indicating a total number of time errors exceeding a threshold (e.g., greater than 10 ms) within a time period.

In some embodiments, analytics module 218 or another module may determine how faithfully or accurately SUT 106 has implemented a TSN schedule or related schedule rules. For example, analytics module 218 may analyze captured traffic and, based on a TSN schedule and/or using timing information of received messages, determine how accurately SUT 106 has implemented a TSN schedule. In this example, analytics module 218 may be capable of performing analysis per message stream and/or per test iteration.

In some embodiments, analytics module 218 or another module may test gate accuracy. For example, SUT 106 may be configured with schedule rules that require messages to begin transmitting after a transmissions gate opens but require that no portion of a message be transmitted after the gate closes. In this example, to test implementation of gate accuracy, SUT 106 may be configured with a TSN schedule or related rules, TPM 204 may transmit traffic for different queues from different ports, and RPMs 214 and 216 and/or another module may validate that relevant scheduling rules at SUT 106 regarding gate accuracy are met (e.g., a transmission overrun statistic remains zero over the test iteration).

Referring to FIG. 2, in step 1, TPM 204 or test packet generator 206 may send a test packet to SUT 106. The test packet may include an expected receive time value indicating when the test packet is expected to be received at port 3 of RPM 214.

In step 2, SUT 106 may send, forward, or otherwise transmit the test packet or a substantially similar packet containing the expected receive time value to RPM 214. RPM 214 may timestamp or otherwise determine an actual receive time for the test packet.

In some embodiments, after receiving one or more test packets, RPM 214 may send timing information (e.g., actual receive times and expected receive times) for each test packet to analytics module 218. In such embodiments, analytics module 218 may generate or compute various metrics or statistics, e.g., time variation metrics associated with actual receive times and expected receive times of the test packets.

It will be appreciated that FIG. 2 is for illustrative purposes and that various nodes and/or modules, locations, and/or functionality described above in relation to FIG. 2 may be changed, altered, added, or removed. For example, various modules or functionality described in FIG. 2 (e.g., test packet generator 206 and expected receive time calculator 208) may be incorporated into TCM 104 or another module or node. In another example, data storages 210 and 212 may be combined into a shared data storage system and/or may be integrated with TCM storage 108. It will be appreciated that TPM 204 may also receive at least some traffic and that RPMs 214 and 216 may also send at least some traffic and that such nomenclature is for convenience and not for indicating limitations of TPM 204 or RPMs 214 and 216.

Figure 3:
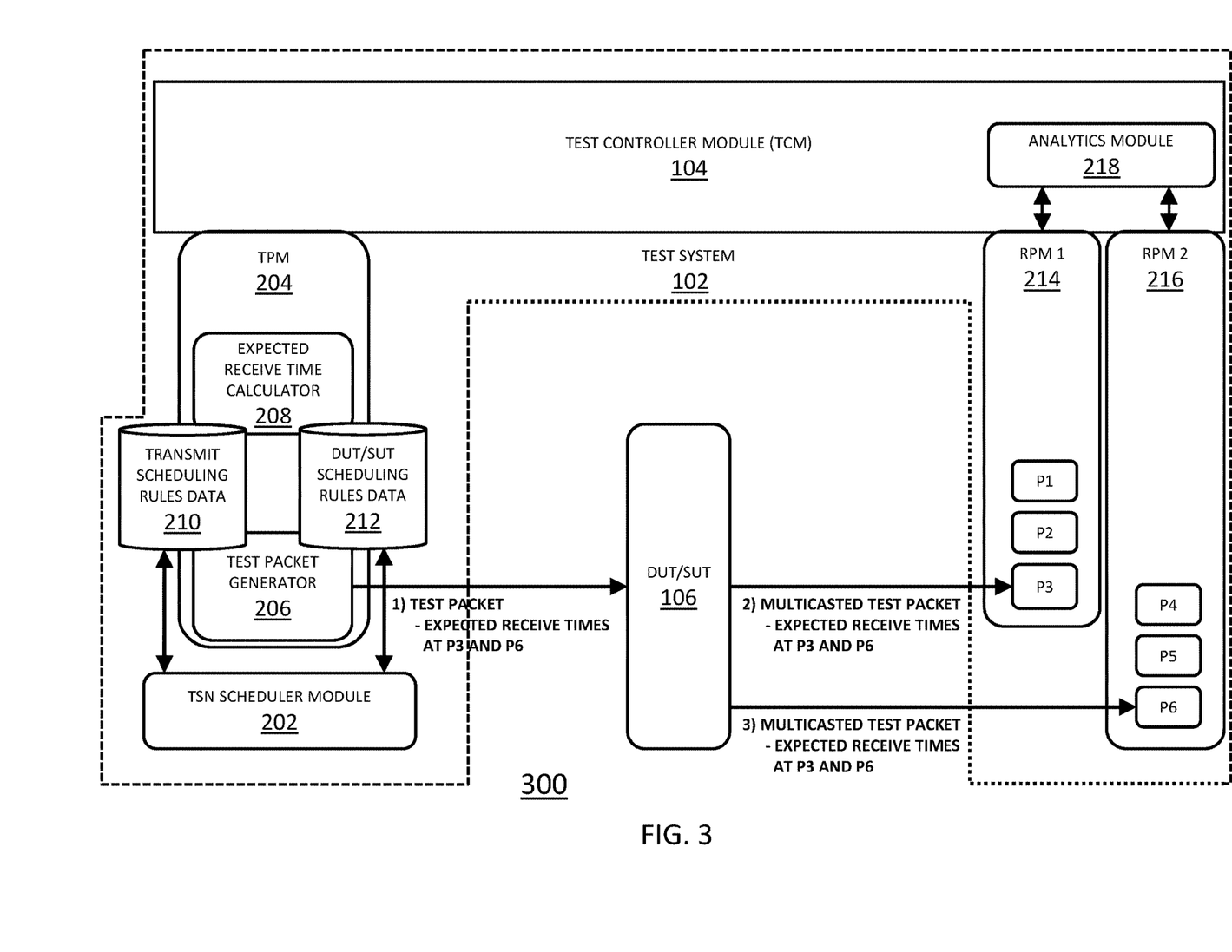
FIG. 3 is a diagram illustrating an example test environment involving sending a test packet to two destinations via a SUT.

FIG. 3 is a diagram illustrating an example test environment 300 involving sending a test packet to two destinations via SUT 106. In some embodiments, test system 102 and/or functionality therein may be distributed among one or more modules, devices, or computing platforms.

Referring to FIG. 3, except as otherwise described herein, test environment 300 may be substantially similar to test environment 200. For example, nodes and entities in FIG. 3 may include similar functionality as similarly named nodes and entities described above with regard to FIG. 2.

In step 1, TPM 204 or test packet generator 206 may send a test packet to SUT 106. The test packet may include a first expected receive time value indicating when the test packet or a substantially similar packet is expected to be received at port 3 of RPM 214 and a second expected receive time value indicating when the test packet or a substantially similar packet is expected to be received at port 6 of RPM 216. The test packet may also include a multicast parameter value or other data that triggers SUT 106 to send multiple copies of the test packet to multiple destinations.

In step 2, SUT 106 may send, forward, or otherwise transmit the test packet or a substantially similar packet containing the expected receive time values to RPM 214 and may send, forward, or otherwise transmit the test packet or a substantially similar packet containing the expected receive time values to RPM 216. Each of RPM 214 and RPM 216 may timestamp or otherwise determine an actual receive time for their respective test packets.

In some embodiments, after receiving one or more test packets, each of RPM 214 and RPM 216 may send timing information (e.g., actual receive times and expected receive times) for each test packet to analytics module 218. In such embodiments, analytics module 218 may generate or compute various metrics or statistics, e.g., time variation metrics associated with actual receive times and expected receive times of the test packets.

It will be appreciated that FIG. 3 is for illustrative purposes and that various nodes and/or modules, locations, and/or functionality described above in relation to FIG. 3 may be changed, altered, added, or removed. For example, various modules or functionality described in FIG. 3 (e.g., test packet generator 206 and expected receive time calculator 208) may be incorporated into TCM 104 or another module or node. In another example, data storages 210 and 212 may be integrated or combined in a shared storage system and/or may be integrated with TCM storage 108. It will be appreciated that TPM 204 may also receive at least some traffic and that RPMs 214 and 216 may also send at least some traffic and that such nomenclature is for convenience and not for indicating limitations of TPM 204 or RPMs 214 and 216.

Figure 4:
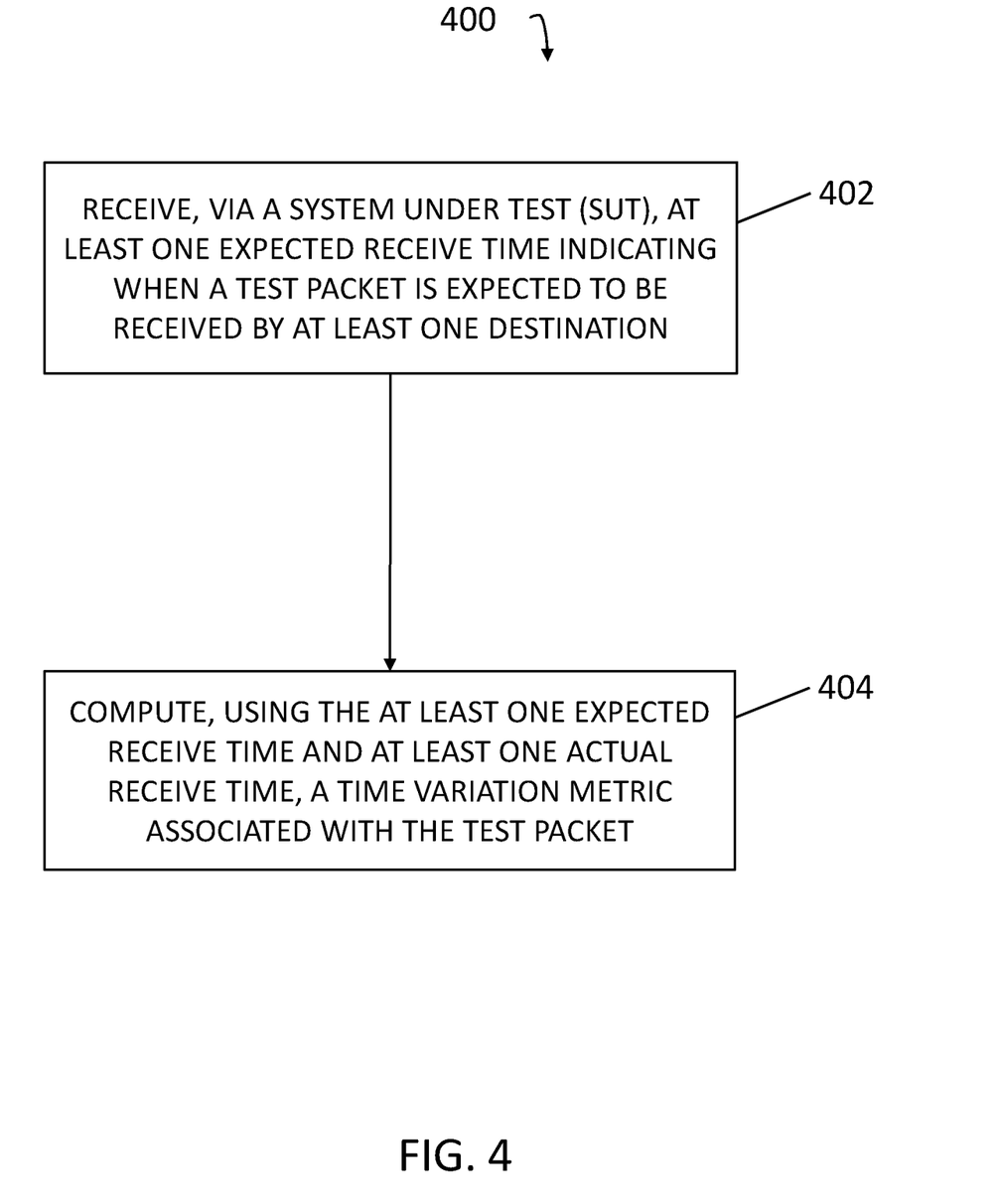
FIG. 4 is a block diagram illustrating an example process for testing scheduling fidelity in a TSN.

FIG. 4 is a block diagram illustrating an example process 400 for testing and/or determining scheduling fidelity in a TSN. In some embodiments, process 400, or portions thereof, may be performed by test system 102, TCM 104, SUT 106, and/or another node or module. In some embodiments, example process 400 may include blocks 402 and/or 404.

In some embodiments, a test system clock may be synchronized with a clock at SUT 106. For example, TCM 104 or a related synchronization module may include, utilize, or communicate with a test system clock. In this example, the test system clock and a clock at SUT 106 may be synchronized using gPTP or another time synchronization protocol. In another example, SUT 106 and test system 102 may use external time inputs from a GPS-based time source.

Referring to example process 400, in block 402, at least one expected receive time may be received via SUT 106. For example, a test packet may contain at least one expected receive time indicating when the test packet may be expected to be received by at least one destination.

In some embodiments, at least one expected receive time may be based on scheduling information associated with a TSN schedule, e.g., a TSN schedule may be any traffic schedule (e.g., a TAS schedule) associated with a TSN. For example, the at least one expected receive time may be based on scheduling information provided by TSN scheduler module 202. In some embodiments, a test packet may be generated by SUT 106, test system 102, or a device (e.g., a talker device) separate from SUT 106 and test system 102.

In some embodiments, a TSN scheduler may be located at by SUT 106, test system 102, or a device (e.g., a talker device) separate from SUT 106 and test system 102.

In some embodiments, a test packet may include a first expected receive time and a second expected receive time. For example, a first expected receive time may indicate when a test packet or a substantially similar packet may be expected to be received by a first destination and a second expected receive time may indicate when the test packet or a substantially similar packet may be expected to be received by a second destination.

In some embodiments, SUT 106 may send a test packet to a first destination and a second destination.

In some embodiments, at least one destination for a test packet may include the test system, a port module at the test system, or a port at the port module.

In some embodiments, scheduling information associated with a TSN schedule may include a test session start time, a test session interval value, a gate access list indicating when a test packet is to be transmitted from an originating node, or a gate access list indicating when the test packet may be to be transmitted from SUT 106.

In block 404, a time variation metric associated with the test packet may be computed using the at least one expected receive time and at least one actual receive time.

In some embodiments, a time variation metric may include a latency metric, a maximum time error, a minimum time error, an average time error, or a metric indicating a total number of time errors exceeding a threshold within a time period.

It will be appreciated that process 400 is for illustrative purposes and that different and/or additional actions may be used. It will also be appreciated that various actions described herein may occur in a different order or sequence.

It should be noted that test system 102, TCM 104, and/or various modules or functionality described herein may constitute a special purpose computing platform, device, or system. For example, test system 102 may be an IxNetwork™ test appliance manufactured by Ixia and configured to perform various aspects described herein. Further, test system 102, TCM 104, and/or various modules or functionality described herein can improve the technological field of network testing by providing a tenable solution for testing TSN elements.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for determining scheduling fidelity in a time sensitive network (TSN), the method comprising:
   in a test system:
   generating a test packet;
   inserting at least two expected receive times into the test packet, wherein each of the at least two expected receive times indicates when the test packet or a substantially similar packet is expected to be received by one of at least two destinations, wherein the at least two expected receive times include a first expected receive time indicating when the test packet or a substantially similar packet is expected to be received by a first destination and a second expected receive time indicating when the test packet or a substantially similar packet is expected to be received by a second destination;
   transmitting the test packet to the system under test (SUT);
   receiving, via the SUT, the test packet or a substantially similar packet containing the at least two expected receive times; and
   computing, using at least one of the at least two expected receive times and at least one of the at least two actual receive times, a time variation metric associated with the test packet.

2. The method of claim 1 wherein at least one of the at least two expected receive times is based on scheduling information associated with a TSN schedule.

3. The method of claim 1 wherein the SUT sends the test packet or a substantially similar packet to the first destination and the second destination.

4. The method of claim 1 wherein at least one of the at least two destinations includes the test system, a port module at the test system, or a port at the port module.

5. The method of claim 2 wherein the scheduling information includes a test session start time, a test session interval value, a gate access list indicating when the test packet is to be transmitted from an originating node, or a gate access list indicating when the test packet is to be transmitted from the SUT.

6. The method of claim 1 wherein the time variation metric includes a latency metric, a maximum time error, a minimum time error, an average time error, or a metric indicating a total number of time errors exceeding a threshold within a time period.

7. A test system for determining scheduling fidelity in a time sensitive network (TSN), the test system comprising:
   at least one processor; and
   a test controller module implemented using the at least one processor, the test controller module configured for:
   generating a test packet;
   inserting at least two expected receive times into the test packet, wherein each of the at least two expected receive times indicates when the test packet or a substantially similar packet is expected to be received by one of at least two destinations, wherein the at least two expected receive times include a first expected receive time indicating when the test packet or a substantially similar packet is expected to be received by a first destination and a second expected receive time indicating when the test packet or a substantially similar packet is expected to be received by a second destination;
   transmitting the test packet to the system under test (SUT);
   receiving, via the SUT, the test packet or a substantially similar packet containing the at least two expected receive times; and
   computing, using at least one of the at least two expected receive times and at least one of the at least two actual receive times, a time variation metric associated with the test packet.

8. The system of claim 7 wherein at least one of the at least two expected receive times is based on scheduling information associated with a TSN schedule.

9. The system of claim 7 wherein the SUT sends the test packet or a substantially similar packet to the first destination and the second destination.

10. The system of claim 7 wherein at least one of the at least two destinations includes the test system, a port module at the test system, or a port at the port module.

11. The system of claim 8 wherein the scheduling information includes a test session start time, a test session interval value, a gate access list indicating when the test packet is to be transmitted from an originating node, or a gate access list indicating when the test packet is to be transmitted from the SUT.

12. The system of claim 7 wherein the time variation metric includes a latency metric, a maximum time error, a minimum time error, an average time error, or a metric indicating a total number of time errors exceeding a threshold within a time period.

13. A non-transitory computer readable medium comprising computer executable instructions embodied in the non-transitory computer readable medium that when executed by at least one processor of a computer cause the computer to perform steps comprising:

in a test system:
generating a test packet;
insetting at least two expected receive times into the test packet, wherein each of the at least two expected receive times indicates when the test packet or a substantially similar packet is expected to be received by one of at least two destinations, wherein the at least two expected receive times include a first expected receive time indicating when the test packet or a substantially similar packet is expected to be received by a first destination and a second expected receive time indicating when the test packet or a substantially similar packet is expected to be received by a second destination;
transmitting the test packet to the system under test (SUT);
receiving, via the SUT, the test packet or a substantially similar packet containing the at least two expected receive times; and
computing, using at least one of the at least two expected receive times and at least one of the at least two actual receive times, a time variation metric associated with the test packet.

14. The non-transitory computer readable medium of claim 13 wherein at least one of the at least two expected receive times is based on scheduling information associated with a TSN schedule.

\* \* \* \* \*

UNITED STATES PATENT AND TRADEMARK OFFICE
CERTIFICATE OF CORRECTION

PATENT NO. : 10,623,297 B2
APPLICATION NO. : 15/647207
DATED : April 14, 2020
INVENTOR(S) : Alon Regev Page 1 of 1

It is certified that error appears in the above-identified patent and that said Letters Patent is hereby corrected as shown below:

On the Title Page

In Column 1, item (30), above "Int. Cl." insert -- Foreign Application Priority Data
Apr. 25, 2017 (RO) ............ A 00246 2017 --, as a new entry.

Signed and Sealed this
Sixteenth Day of June, 2020

Andrei Iancu
*Director of the United States Patent and Trademark Office*